United States Patent [19]

Kato

[11] Patent Number: 4,507,763

[45] Date of Patent: Mar. 26, 1985

[54] OPTICAL INFORMATION RECORDING AND/OR REPRODUCING APPARATUS AND OPTICAL RECORD MEDIUM FOR USE IN SUCH APPARATUS

[75] Inventor: Kiichi Kato, Hachioji, Japan

[73] Assignee: Olympus Optical Co., Ltd., Japan

[21] Appl. No.: 343,479

[22] Filed: Jan. 28, 1982

[30] Foreign Application Priority Data

Feb. 5, 1981 [JP] Japan .................................. 55-14914

[51] Int. Cl.³ .......................... H04N 5/76; H04N 7/00
[52] U.S. Cl. ...................................................... 369/44
[58] Field of Search .................... 358/342; 369/43, 44, 369/45, 46, 111, 109, 121; 250/201-204

[56] References Cited

U.S. PATENT DOCUMENTS 4,315,283  2/1982  Kinjo et al. ...................... 369/44 X
4,331,976  5/1982  Kinjo et al. ...................... 369/44 X Primary Examiner—Robert L. Richardson
Attorney, Agent, or Firm—Parkhurst & Oliff

[57] ABSTRACT

A disc-shaped record medium has a recording surface which is divided into a number of concentric recording regions and has a number of concentric guide tracks formed at boundaries between successive recording regions. A number of concentric or spiral information tracks are formed in an optically readable form in respective recording regions with a constant pitch in reference to respective guide tracks and the guide tracks are also recorded in an optically readable form. In an instance of effecting the recording or reproducing for a certain recording region, the guide track related to the relevant recording region is always read out by a tracking light beam which is controlled to trace the guide track and a recording or reproducing light beam is controlled with reference to the guide track so as to trace the information track precisely. The tracking light beam and the recording or reproducing light beam are focussed by a common objective lens onto the record medium and an inclination angle of the recording or reproducing light beam with respect to the tracking light beam is changed in a stepwise or continuous manner by rotating a swingable mirror arranged in the path of the recording or reproducing light beam. The recording or reproducing light beam is shifted in a radial direction of the record medium disc to trace the concentric or spiral information tracks. In the guide tracks are formed additional signals, such as address signals and synchronizing signals which are used for effecting random access.

24 Claims, 10 Drawing Figures

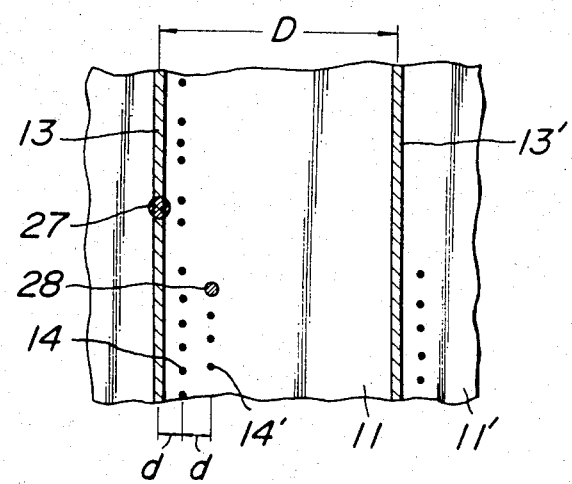
FIG_3
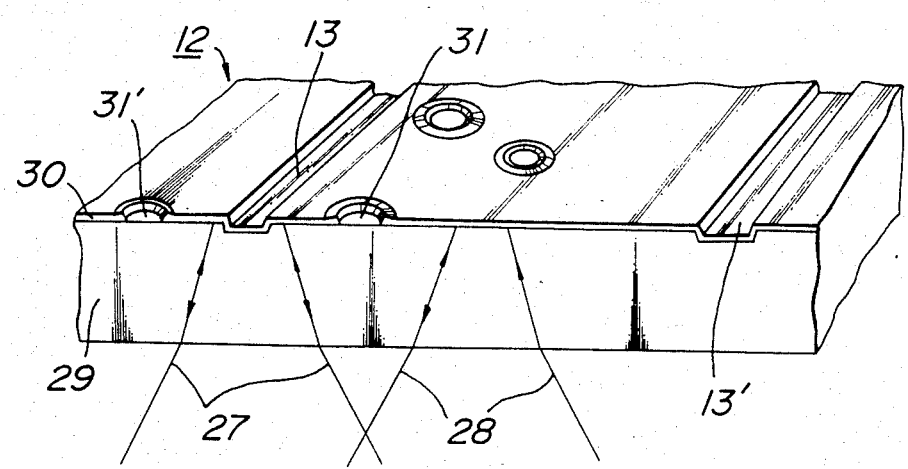
FIG_4

FIG. 5A
FIG. 5B
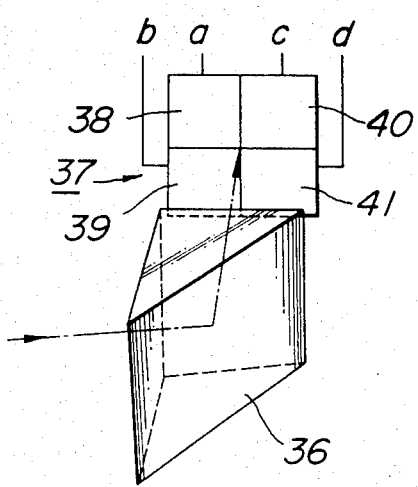
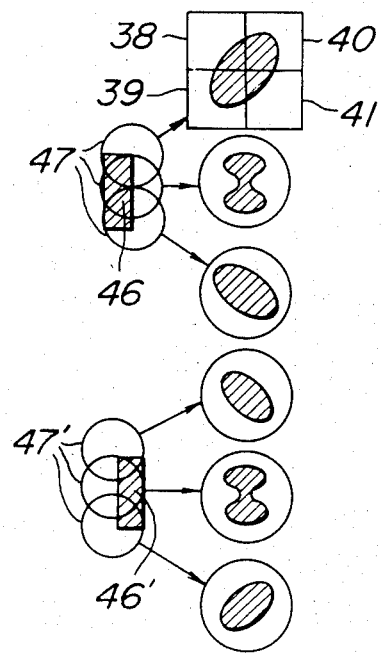

OPTICAL INFORMATION RECORDING AND/OR REPRODUCING APPARATUS AND OPTICAL RECORD MEDIUM FOR USE IN SUCH APPARATUS

BACKGROUND OF THE INVENTION

The present invention relates to a technique for recording information on a record medium along spiral or concentric information tracks in an optically readable form and for reproducing the information thus recorded.

In an instance of effecting an optical recording and reproducing while using a disc-shaped record medium, it is necessary to avoid interference between adjacent tracks caused by vibration due to a deviation in movement of an optical system for projecting a recording or reproducing light beam onto the record disc and a small eccentricity of a rotating center which might be produced upon exchanging the record discs with respect to a turntable.

FIG. 1 is a schematic view illustrating a general construction of a known optical recording and/or reproducing apparatus. In one instance of recording an information signal, a semiconductor laser light source 1 is driven by a laser driver 2 to generate a light beam having an intensity modulated with the information signal to be recorded. The light beam thus generated is converted by a collimator lens 3 into a parallel light flux which is then focussed by an objective lens 4 onto a record medium 5 as a small light spot to form a concentric or spiral track 10 which consists of an array of pits corresponding to the information signal and having a property which can be read out optically.

During reproduction, the light beam having a constant intensity is generated from the semiconductor laser light source 1 and is focussed by means of the collimator lens 3 and the objective lens 4 onto the information track 10 as a light spot, while the record medium 5 is rotated. The reflected light from the record medium 5 is modulated in accordance with the recorded information signal and is collected by the objective lens 4. The light emanating from the lens 4 is transmitted through a quarter-wavelength plate 8 twice and is then reflected by a polarizing beam splitter 25 toward a photoelectric converting device 6. An output signal from the photoelectric converting device 6 is amplified by an amplifier 7 to produce a reproduced information signal.

During the recording, the focussed light spot is shifted at a constant speed in a radial direction with respect to the disc-shaped record medium 5 by moving an optical system 9 including the optical elements 1, 3, 4, 8 and 25 in the radial direction as shown by a double-headed arrow in FIG. 1. During this movement of the optical system 9, if the travelling speed of the system 9 fluctuates, pitches of successively formed tracks might be varied. Such a variation in the track pitch might also be produced due to mechanical vibration of a turntable and eccentricity of the record medium. In an extreme case, adjacent tracks might be partially superimposed or crossed with each other and the information in the superimposed or crossed portion could not be effectively reproduced. Further, the eccentricity is usually produced whenever the record medium 5 on the turntable is exchanged with another record medium. During reproduction, the above mentioned problem also occurs. Therefore, it is necessary to space the successive tracks by a sufficiently large pitch so as not to interfere with each other. This causes a serious drawback in that a high density recording (which is one of the most important properties of the record medium of this type) could not be attained.

In order to avoid the above mentioned drawback, a so-called tracking control is usually effected so that the recording or reproducing light beam can follow precisely the information track. For instance, in IEEE spectrum August 1979, pages 26 to 33, there has been proposed a pregrooved disc having grooves previously formed therein. During the recording, the grooves are reproduced optically to derive a tracking error signal and the position of the recording light beam is controlled by the tracking error signal. In this instance, since the information tracks are always formed along the grooves, undesired interference between the tracks can be eliminated. However, in such a pregrooved disc, the information pits are formed in the grooves and thus, there is a possibility that the information might be deteriorated by defects inherently formed in the grooves. Such defects might not cause a serious problem for analog information such as video and audio signals, but for digital data such defects might cause impermissible errors.

SUMMARY OF THE INVENTION

The present invention has for its object to provide an optical information recording apparatus which can obviate the above mentioned drawbacks and can record an information signal with high density to form information tracks at a predetermined small pitch in an accurate manner.

According to the invention, an apparatus for recording optically an information signal along concentric or spiral information tracks on a record medium in an optically readable form by projecting a recording light beam having an intensity modulated in accordance with the information signal to be recorded, comprises means for rotating a record medium having a recording surface which is divided into a plurality of concentric recording regions and a plurality of concentric guide tracks which are recorded in an optically readable form at boundaries between successive recording regions;

means for generating a tracking light beam for reading out said guide tracks;

means for focussing the tracking light beam onto the guide tracks;

means for detecting a tracking error signal representing a deviation of the tracking light beam with respect to a certain guide track;

means for controlling the tracking light beam to trace the relevant guide track in response to the detected tracking error signal as long as the recording is effected in a recording region corresponding to the relevant guide track;

means for emitting a recording light beam modulated in accordance with the information signal to be recorded;

means for focussing the modulated recording light beam onto the record medium; and means for controlling the recording light beam with reference to a position of the relevant guide track to form concentric or spiral information tracks in the relevant recording region.

It is another object of the invention to provide an optical information reproducing apparatus in which a reproducing light beam can follow information tracks accurately to reproduce an original information signal in a reliable manner.

According to the invention, an apparatus for reproducing optically an information signal recorded along concentric or spiral information tracks on a record medium in an optically readable form by scanning the information tracks by means of a reproducing light beam, said record medium having a recording surface which is divided into a plurality of concentric recording regions in which said information tracks are formed and a plurality of concentric guide tracks which are recorded in an optically readable form at boundaries between successive recording regions, comprises means for generating a tracking light beam for reading out said guide tracks;

means for focussing the tracking light beam onto the guide tracks;

means for detecting a tracking error signal representing a deviation of the tracking light beam with respect to a certain guide track;

means for controlling the tracking light beam to trace the relevant guide track in response to the detected tracking error signal as long as the reproducing is effected in a recording region corresponding to the relevant guide track;

means for emitting a reproducing light beam having a constant light intensity;

means for focussing the reproducing light beam onto the record medium; and means for controlling the reproducing light beam with reference to a position of the relevant guide track to follow the concentric or spiral information tracks in the relevant recording region.

It is still another object of the invention to provide an optical information record medium which can be advantageously applied in the optical information recording and/or reproducing apparatus and in which information tracks can be formed with a constant pitch in a precise manner.

According to the invention, an optical information recording medium comprises a substrate having a recording surface;

a plurality of concentric recording regions provided in said recording surface, in each of said recording regions a number of concentric or spiral information tracks being formed in an optically readable form; and a plurality of concentric guide tracks formed at boundaries between successive recording regions in an optically readable form, each guide track being related to respective recording regions in such a manner that as long as recording or reproducing is effected for a certain recording region, a guide track corresponding to the relevant recording region is always read out optically by means of a tracking light beam and that a recording or reproducing light beam is controlled with reference to the position of the relevant guide track.

According to the invention, the concentric guide tracks have been previously recorded on an information disc in the form of optically readable tracks, and during the recording or reproducing, the position of the recording or reproducing light beam is controlled or adjusted in a radial direction with reference to the position of the guide track. In this instance, in order to read out the guide track, the tracking light beam for scanning the guide track is projected onto the record medium and the recording or reproducing light beam is shifted in the radial direction with respect to the tracking light beam, while a deviation of the tracking light beam with respect to the guide track is compensated for. Therefore, the recording or reproducing light beam is controlled to always follow the information tracks which are concentric with the guide track.

BRIEF DESCRIPTION OF THE DRAWINGS

FIG. 3 is a plan view depicting schematically a part of an embodiment of the information record medium according to the invention;

FIG. 4 is a perspective view illustrating the record medium shown in FIG. 3;

FIG. 5A is a perspective view showing an embodiment of an optical system for detecting a tracking error signal and FIG. 5B is a schematic view representing a relation between tracking error and light beam pattern;

DESCRIPTION OF THE PREFERRED EMBODIMENTS

Figure 1:
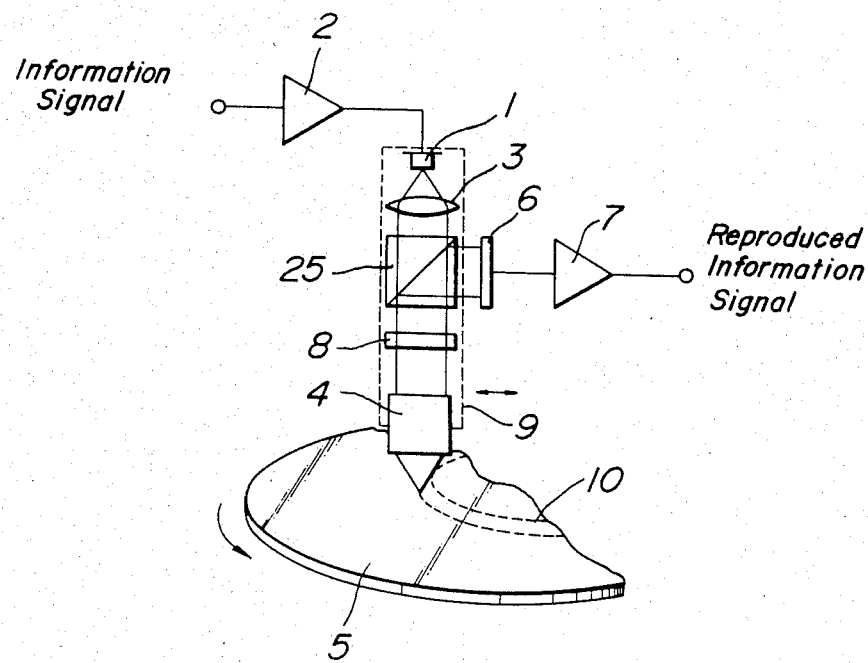
FIG. 1 is a schematic view illustrating a known optical information recording and reproducing apparatus.
Figure 2:
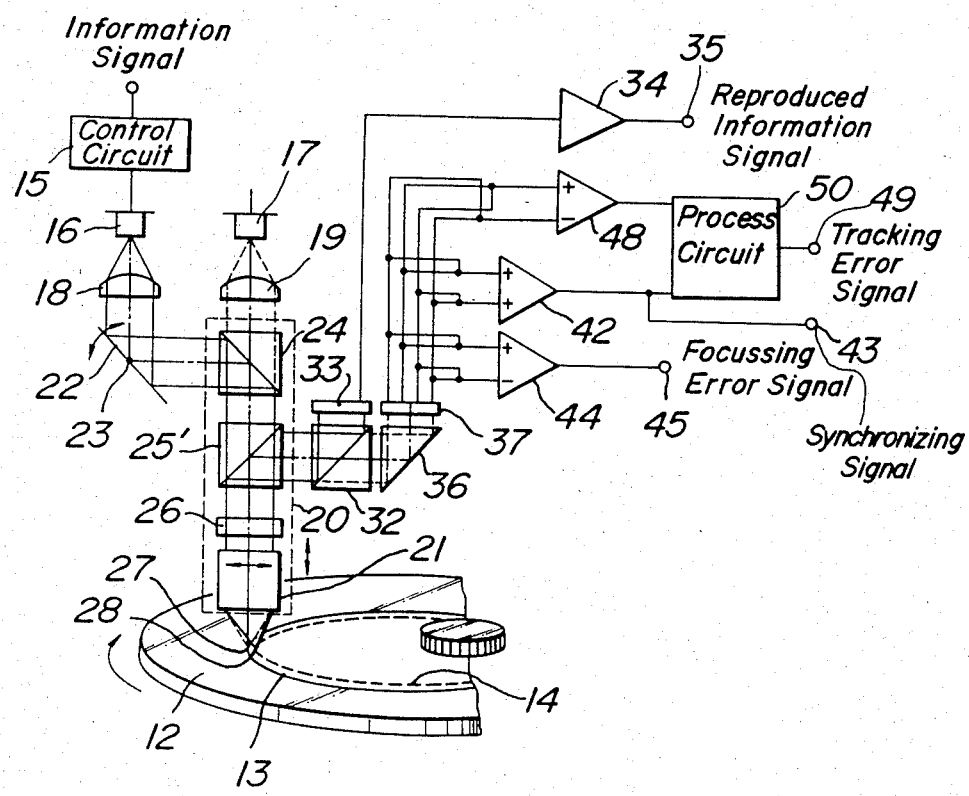
FIG. 2 is a schematic view showing one embodiment of the optical information recording and reproducing apparatus according to the invention.

FIG. 2 shows a construction of the optical information recording and reproducing apparatus according to the invention in which use is made of a record medium 12 shown in FIGS. 3 and 4. As shown in FIG. 3 on an enlarged scale, the record medium 12 includes a plurality of concentric recording regions 11, 11' . . . of ring shape and in each region are formed a plurality of concentric or spiral information tracks 14, 14' . . . . The record medium 12 further comprises a plurality of concentric guide tracks 13, 13' . . . between adjacent information regions 11, 11' . . . . The guide tracks 13, 13' as well as the information tracks 14, 14' are recorded in an optically readable manner. The guide tracks may be recorded during the information recording, but it is preferable to form the guide tracks prior to the information recording.

The apparatus shown in FIG. 2 can effect both the recording and reproducing and comprises a recording and reproducing laser light source 16 and a tracking laser light source 17 for reading the guide tracks. These laser light sources generate polarized laser light beams having different wavelengths. The apparatus comprises a control circuit 15 which controls the laser light source 16 in such a manner that during recording, the intensity of the laser beam is modulated in accordance with the information signal to be recorded, but during reproducing, the laser beam of a constant intensity is generated. Now the reproducing operation will be first explained. The laser beams are converted into parallel light fluxes by collimator lenses 18 and 19, respectively, and are introduced into a common optical system 20 and are focussed by a common objective lens 21 onto the information record medium 12 placed on a rotating turntable. In an optical path of the reproducing laser beam (before the optical system 20) is arranged an optical axis inclination variable optical element 22, for instance, a swingable mirror journaled by a shaft 23. The element 22 makes the optical axis of the reproducing laser beam inclined with respect to the optical axis of the tracking laser beam which is made coincident with an optical axis of the objective lens 21. The common optical system 20 comprises, in addition to the objective lens 21, a dichroic mirror 24 for mixing the reproducing and tracking laser beams, a quarter-wavelength plate 26 for rotating a polarizing direction of the light reflected by the record medium 12 and collected by the objective lens 21 and a polarizing beam splitter 25' for directing the reflected light beams toward a different direction from the light sources due to the polarization.

In such a construction, the objective lens 21 is controlled in a radial direction so that the light spot from the tracking laser light source 17 can follow the guide track 13 on the information record medium 12 and a distance between the tracking light spot 27 and reproducing light spot 28 can be fixed by an inclination angle of the swingable mirror 22. Therefore, as long as said angle is not changed, the distance between these light spots is not varied. Therefore, as long as the tracking light spot 27 follows the guide track accurately the tracking positions of the reproducing light beam do not come close to each other and thus, the high density recording can be easily achieved even though the mechanical vibration and eccentricity might occur.

In the actual reproducing, the inclination of the movable mirror 22 is changed in synchronism with the rotation of the information record medium 12 to vary the distance between the tracking light spot 27 and reproducing light spot 28 by an integer multiple of a track pitch d. Then, the information tracks 14, 14' on the record medium can be accurately traced by the reproducing light spot 28 so that the original information signal can be reproduced in a precise and stable manner.

In case of recording, the light intensity of the laser beam emitted from the laser 16 is modulated by the control circuit 15 with the information signal and the modulated light beam is focussed on the information recording area 11 of the record medium 12. During the recording process, the distance between the recording beam spot 28 and tracking beam spot 27 is set to a given distance by adjusting the inclination angle of the movable mirror 22. Therefore, the information track consisting of the pit array formed by the recording beam spot 28 can be precisely positioned with respect to the guide track 13 and thus, the high density recording can be effected without causing interference between adjacent tracks.

In the above embodiment, the record medium is divided into a plurality of the concentric recording regions 11, 11' and the guide tracks 13, 13' are provided between adjacent recording regions. In such a case, the distance D between successive guide tracks 13, 13' may be set to a value within such a range that the recording beam is not subjected to aberrations and to loss of light amount.

The present invention is not limited to the embodiment explained above. For instance, it is not always necessary that the guide track be adjacent to the corresponding recording region. For example, the guide track 13 may be used for the recording regions 11'. In such an instance, it is possible to form the information tracks in the region 11' and to reproduce the information tracks recorded in the region 11' while the guide track 13 is used as the reference track. Further, in such an instance it is preferable to focuss the recording and reproducing light beam and the tracking light beam by means of separate objective lenses.

The guide track may be formed by an array of holes formed in a metal film applied on a substrate of the record medium 12, and such a guide track may be read out optically in the same manner as reading out the information track consisting of the pit array. Further, the guide track may be preferably constructed by a groove having given dimensions similar to that of a known pregrooved video disc.

FIG. 4 shows the guide tracks 13, 13' formed by grooves which have been previously formed in the record medium 12. The record medium 12 comprises a transparent substrate 29 and grooves having a depth equal to about a quarter-wavelength of the tracking light beam are formed in one surface of substrate 29. Then, a thin film 30 of photosensitive material is applied to the surface of the substrate. The photosensitive material may be a metal having a low melting point. In such a record medium 12, the guide tracks 13, 13' formed by the grooves can be optically read out by means of the tracking light beam.

In order to effect the tracking servo control, a tracking error signal representing a deviation of the tracking light spot 27 with respect to the guide tracks 13, 13' may be derived by any one of known methods such as the three beam method, wobbling method and far field method. The far field method may be applied to the record medium with the guide tracks in the form of grooves having a depth not equal to ($\lambda/4n$) (wherein $\lambda$ is a wavelength of the tracking light beam and n is a refractive index of the substrate 29). In this case, the tracking error signal may be easily derived by detecting a far field image formed by the tracking light beam reflected by the record medium 12.

In the apparatus shown in FIG. 2, the tracking error signal, focussing error signal and information signal may be derived by detecting the tracking light beam and the reproducing light beam reflected by the record medium 12, collected by the objective lens 21 and reflected by the polarizing beam splitter 25'. For this purpose, the light beams reflected by the polarizing beam splitter 25' are separated by a dichroic mirror 32. That is, the reproducing light beam modulated by the information recorded in the information track 14 is reflected by the dichroic mirror 32 and is made incident upon a light detector 33. An output signal supplied from the light detector 33 is amplified by an amplifier 34 which produces the reproduced information signal at an output terminal 35.

The tracking light beam reflected by the guide track 13 is transmitted through the dichroic mirror 32 and is made incident upon a detection prism 36 having a reflection surface set substantially at a critical angle. The light beam reflected by the prism 36 is received by a light detector 37 having four divided light receiving regions. FIG. 5A is a perspective view showing an arrangement of the detection prism 36 and the light detector 37 comprising the four light receiving regions 38 to 41. The detection prism 36 is so arranged that when the record medium 12 is in an in-focussed position with respect to the objective lens 21, the tracking light beam reflected by the record medium is made incident upon the prism as a parallel light flux substantially at the critical angle and thus, the tracking light beam is totally reflected by the detection prism 36. Contrary to this, when the record medium 12 deviates in the direction parallel to the optical axis of the objective lens 21, the tracking light beam is changed into a converging or diverging light flux and thus, a part of the tracking light beam is transmitted through the reflection surface of detection prism 36. Therefore, by deriving a difference between a first sum of output signals a and b from the regions 38 and 39 and a second sum of output signals c and d from the regions 40 and 41 by means of a differential amplifier 44, the focussing error signal can be obtained at an output terminal 45.

According to the invention, in the guide track 13, there may be recorded additional information such as a synchronizing signal, track number, recording region number and sector number. Such an additional information signal may be reproduced at an output terminal 43 by deriving a sum of the output signals a, b, c and d from the regions 38 to 41 by means of an adder 42.

In the present embodiment, the light detector 37 having the four divided light receiving regions is arranged in a far field of the objective lens 21 and thus, a pattern of the light spot of the tracking light beam impinging upon the light detector 37 is changed as shown in FIG. 5B in accordance with a position or deviation of the tracking light beam spots 47, 47' and pits 46, 46' forming the guide track 13. Then, by deriving a difference between a third sum of the output signals a and d and a fourth sum of the output signals b and c by means of a differential amplifier 48 and by supplying the difference signal thus derived to a signal process circuit 50 to which is also supplied the additional information signal from the adder 42, the tracking error signal is generated at an output terminal 49. In the signal processing circuit 50, a phase difference between the difference signal and the additional information signal such as the synchronizing signal is detected and the tracking error signal is generated in accordance with the detected phase difference. The above mentioned method for deriving the focussing and tracking error signals have been explained in copending U.S. patent application Ser. Nos. 195,075, No. 292,929 and No. 292,930 and thus the detailed explanation thereof is omitted here. The above mentioned variation of the pattern of light beam spot impinging upon the light detector is produced as long as the guide track is formed by the pits which can be optically read out. Therefore, the pits constituting the guide tracks may be of either the phase type or the amplitude type and thus, the guide track may be formed prior to the recording in accordance with a given format.

Under the control of the focussing and tracking error signals thus derived, the objective lens 21 is moved by means of known servo control mechanisms in the focussing direction parallel to the optical axis of the objective lens 21 and in the tracking direction perpendicular to the optical axis and the track tangential direction so that the tracking light beam spot follows the guide track, while the recording or reproducing light beam is moved in the radial direction, i.e. the tracking direction by adjusting the movable mirror 22.

In the above embodiment, the tracking light beam and the recording or reproducing light beam have different wavelengths and are separated from each other on the basis of the difference in wavelength. However, according to the invention, they may have the same wavelength. In this case, they may be polarized differently and may be separated from each other on the basis of the difference in polarization, or they may be separated by means of any suitable beam splitting means.

Figure 6:
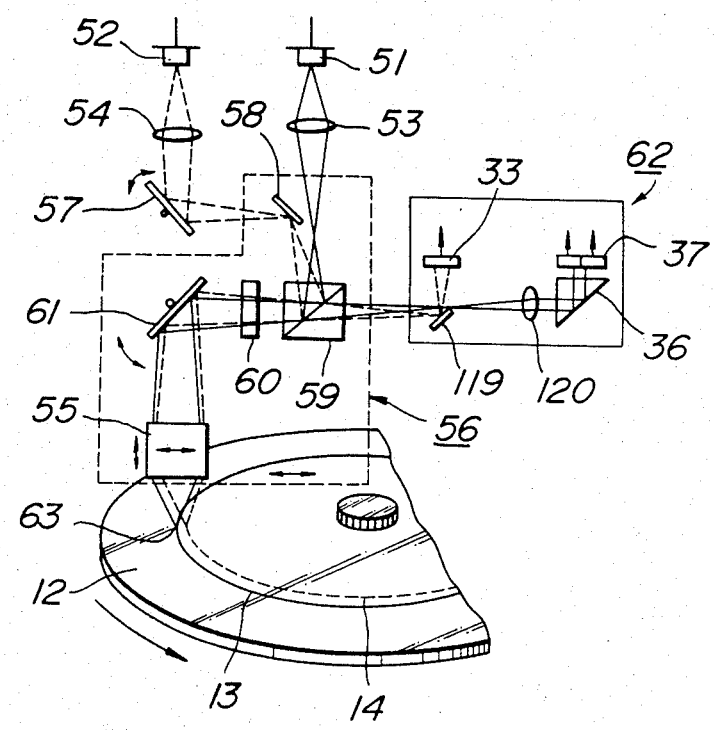
FIG. 6 is a schematic view showing another embodiment of the optical information recording and reproducing apparatus according to the invention.

FIG. 6 is a schematic view illustrating another embodiment of the apparatus according to the invention. In this embodiment, tracking and recording or reproducing light beams emitted from a tracking laser light source 51 and a recording and reproducing laser light source 52, respectively are combined with each other by collimator lens 53 and 54 and a splitting mirror 58 arranged in a common optical system 56. In FIG. 6, these beams are shown as being separated in a plane of the drawing, but in practice, they are separated perpendicularly to the plane of drawing. The recording and reproducing light beam can be inclined with respect to the tracking light beam by means of a movable mirror 57 serving as an inclination angle changing optical element. The inclination angle is changed in a stepwise or sawtooth manner in synchronism with the rotation of the record medium 12 so as to change the distance between the tracking light beam spot and the recording or reproducing light beam spot focussed on the record medium by an objective lens 55. In this manner, the recording or reproducing light beam can trace the concentric or spiral tracks having the given constant pitch. Between the splitting mirror 58 and the objective lens 55 are arranged a polarizing beam splitter 59, a quarter-wavelength plate 60 and a galvanic mirror 61. By swinging the galvanic mirror 61, the light beams can be deflected in the track radial direction, while the angle formed by the optical axes of these light beams is maintained to a desired value.

The recording or reproducing light beam and the tracking light beam reflected by the record medium 12 are collected by the objective lens 55 and are transmitted through the polarizing prism 59 into a processing unit 62 comprising a lens 120, a detection prism 36, a light detector 37, a reflection mirror 119 and a light detector 33. The tracking light beam is made incident upon the detection prism 36 and the light beam reflected by the detection prism 36 is received by the light detector 37 comprising four divided light receiving regions which produce output signals from which the focussing error signal, the tracking error signal and the additional information signal can be derived in the similar manner to that explained above with reference to FIG. 2. Further, the light detector 33 receives the reproducing light beam reflected by the record medium 12 and generates the information signal.

In the present embodiment, the tracking servo is effected by adjusting the galvanic mirror 61 in accordance with the detected tracking error signal in such a manner that the tracking light beam spot 63 can follow the guide track 13 accurately. Then, the recording or reproducing light beam spot is moved together with the tracking light beam spot in the same direction by the same amount and thus, the recording or reproducing light beam spot can follow the information track with reference to the guide track in a precise manner without causing undesired interference between successive tracks and the high density recording can be realized.

As explained above, according to the invention, it is possible not only to use the guide track exclusively for the tracking control but also to record the additional information signal along the guide track. For instance, the guide track may be formed by a pit array which has been formed by recording the additional information signal such as a synchronizing signal and various kinds of address signals in an optically readable form.

Figure 7A:
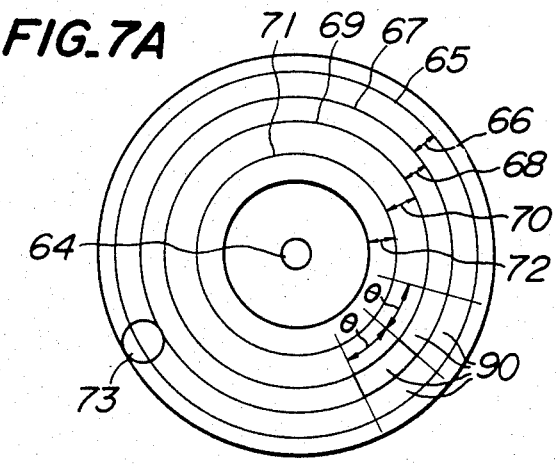
FIG. 7A is a plan view illustrating another embodiment of the record medium according to the invention and FIG. 7B is a schematic view of a part of the record medium shown in FIG. 7A.
Figure 7B:
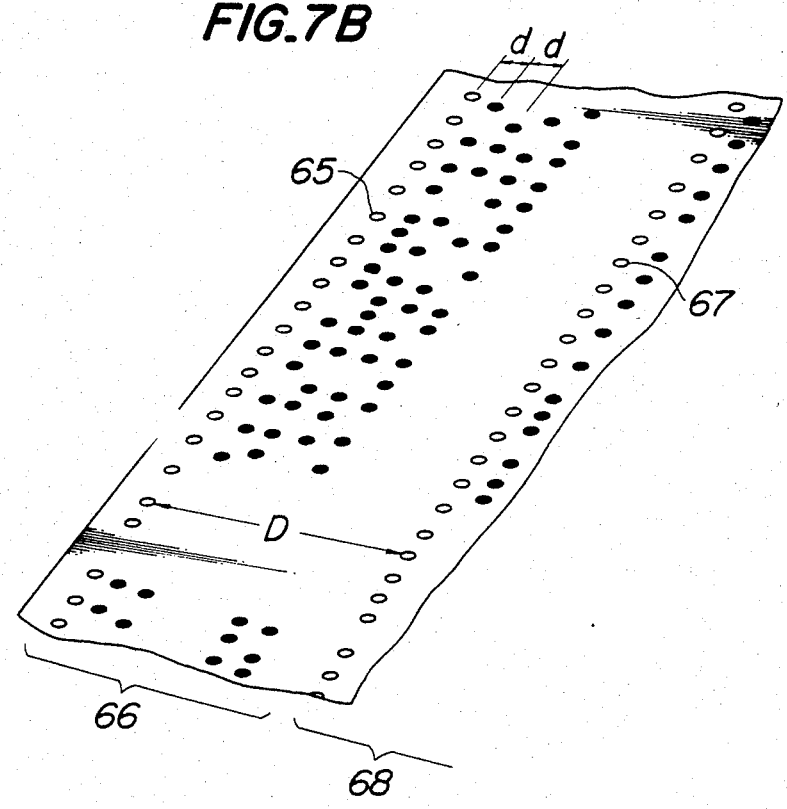

FIGS. 7A and 7B illustrate another embodiment of the record medium according to the invention. In the present embodiment, the record medium 63 comprises a plurality of recording regions 66 formed concentrically about a rotating center axis 64 and in each region, a plurality of tracks are formed concentrically or spirally and one of these tracks is used as the guide track 65. That is to say, each tracks 65, 67, 69 and 71 formed in respective regions 66, 68, 70 and 72 are used as the guide track. These guide tracks are separated from each other by a distance D. When the information tracks are recorded with a constant pitch d, in a respective region there may be formed ((D/d)−1) information tracks. Further in the present embodiment, each information track is divided in a circumferential direction by a constant angle θ to form a plurality of sectors 90 each of which is denoted by radial and circumferential address signals. These address signals as well as the track address signal and the synchronizing clock signal necessary for reproducing the sector addresses are recorded in the guide tracks 65, 67, 69 and 71 in the form of optically readable pits. These additional information signals are read out optically by means of the tracking light beam and the position of the recording or reproducing light spot with respect to the tracking light beam spot is controlled by the read out address signal. Then, the extremely high speed random access can be effected.

Figure 8:
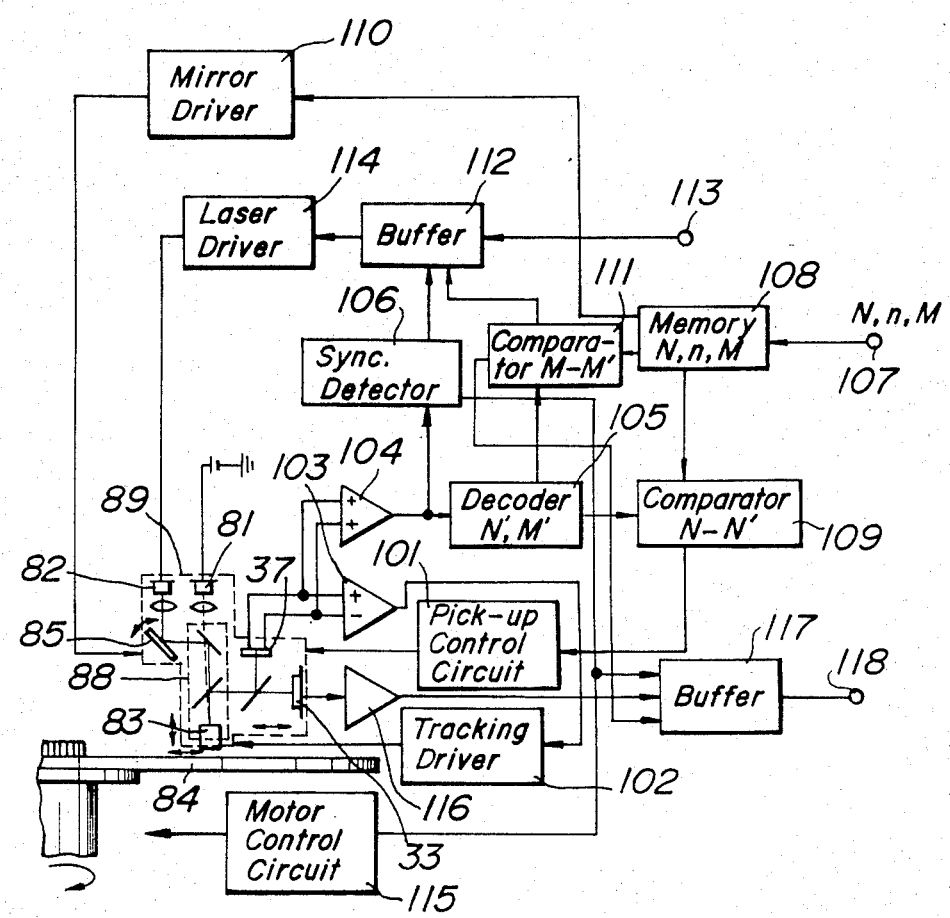
FIG. 8 is a schematic view showing still another embodiment of the optical information recording and reproducing apparatus according to the invention in which random access recording and reproducing can be effected.

FIG. 8 is a schematic view illustrating an embodiment of the apparatus according to the invention which can effect the above mentioned random access by means of the record medium shown in FIGS. 7A and 7B.

Also in this embodiment, light beams emitted from tracking light source 81 and recording and reproducing light source 82 are focussed onto an information record medium 84 by means of a common optical system 88 including a common objective lens 83. Further, the tracking light beam is controlled by a tracking and focussing servo mechanism to follow the guide track precisely and the recording or reproducing light beam is controlled by a swingable mirror 85 so as to follow the information track accurately. That is to say, the inclination angle of the recording or reproducing light beam with respect to the tracking light beam is adjusted by rotating the swingable mirror 85 so that the distance between the recording or reproducing light beam spot and the tracking light beam spot on the record medium 84 is maintained to a given value. Moreover, the tracking error signal, focussing error signal and the information signal can be derived from the output signal from light detectors 33 and 37 in the same manner as that explained with reference to the previous embodiments. The light sources 81, 82, the objective lens 83, the swingable mirror 85 and the light detectors 33 and 37 as well as remaining optical elements and the tracking and focussing servo mechanisms are arranged in an integral body constituting an optical pick-up 89 which may be moved in the radial direction of the disc-shaped record medium 84.

Now the recording operation will be first explained. It is assumed that the radial addresses N, the circumferential addresses M, the synchronizing signal, etc. have been previously recorded in the guide tracks of the record medium 84, and the tracking light beam is tracing an N'th guide track. The position of the pick-up 89 with respect to the guide track is effected by a pick-up position control circuit 101 and the deviation of the tracking light beam spot with respect to the guide track is corrected by moving the objective lens 83 in the radial direction under the control of a tracking actuator driving circuit 102. The output signals from the light detector 37 are supplied to a differential amplifier 103 to generate the tracking error signal which is supplied to the tracking actuator driving circuit 102 to effect the tracking servo control. Therefore, when the tracking ight beam spot is deviated from the guide track, the objective lens 83 is driven in the radial direction so that the deviation can be compensated for. The output signals from the light detector 37 are summed up by an adder 104 to derive the additional information signal recorded in the relevant guide track. The additional information signal thus derived is supplied to a decoder 105 including a buffer and a synchronous detector 106. In the decoder 105, the sector addresses N' and M' are reproduced and in the synchronous detector 106 the synchronizing signal, i.e. the clock signal is regenerated. The synchronizing signal is supplied to a motor control circuit 114 which controls the rotation of the record medium 84.

It is now assumed that a sector having sector addresses N, n and M is to be accessed. In this case, the addresses N, n and M are supplied externally from an input terminal 107 to an address memory 108 and are stored therein. At first the coarse radial address N denoting the recording region number is compared with the read out radial address N' in a comparator 109 which produces an output signal corresponding to a difference between the addresses N and N'. This output signal is supplied to the pick-up position control circuit 101 to move the pick-up 89 in the radial direction until the tracking light beam scans the Nth guide track.

The fine radial address n representing the information track number in the relevant recording region is supplied to a mirror control driving circuit 110 to move the swingable mirror 85 until the distance between the recording light beam spot and the tracking light beam spot becomes a given value corresponding to the fine radial address n. In this manner, the recording light beam can be controlled to scan a desired information track defined by the radial addresses N and n.

At the same time, the circumferential address M' read out of the guide track is compared with the externally supplied circumferential address M in a comparator 111. When the comparator 111 detects an identification between these addresses M' and M, it produces an output signal to a recording signal buffer 112 including a gate circuit. The information signal to be recorded is supplied from an input terminal 113 to the buffer 112 and the buffer supplies selectively the information signal to a laser driving circuit 114 under the control of the identification signal form the comparator 111 and the synchronizing signal from the detector 106. Then the recording and reproducing laser light source 82 is driven by the information signal for a correct time interval and the information signal is recorded in the given sector denoted by the externally supplied addresses N, n and M along a concentric or spiral track constituted by an array of optically readable pits.

During reproduction, the recording and reproducing laser light source 82 is driven into a continuously oscillating mode to emit the laser light beam having a constant intensity. The light beam reflected by the record medium 84 is received by the light detector 33 and an output information signal from the light detector is amplified by an amplifier 116. The amplified information signal is supplied to a buffer 117 which supplies selectively the information signal at the timing of the synchronizing signal from the synchronous detector 106 under the control of the output signals from the comparators 109 and 111. In this manner at an output terminal 118 there is obtained the desired information signal read out of the given sector denoted by the externally denoted addresses N, n and M.

As explained above in detail, according to the invention, the tracking light beam is controlled to follow the guide tracks which have been previously formed in the information record medium and the recording or reproducing light beam is adjusted by inclining in the radial direction the recording or reproducing light beam with respect to the tracking light beam and thus, the recording and reproducing can be affected without being effected by the eccentricity of the rotational center due to the exchange of the record mediums and the vibration. Further, the distance between the tracking light spot and the recording or reproducing light spot on the record medium is not influenced by the variation in mutual position of the optical pick-up and the record medium due to the mechanical vibration and the recording or reproduction can be carried out with the given track pitch. Moreover, according to the invention it is sufficient to form a single guide track for respective recording regions in which a number of information tracks up to several tens can be recorded. Therefore, the decrease in the record capacity due to the presence of the guide tracks is very small and can be neglected. In this connection, according to the invention, the various additional information signals such as the address signal and the synchronizing signal may be recorded on the guide track. In such a case, the guide track can be utilized efficiently without introducing the decrease in record capacity. In this manner, the very high density recording can be realized by means of relatively simple circuitry.

Further, according to the invention, the mutual positional control between the recording or reproducing light spot and the tracking light spot can be effected independently from the focussing servo control and therefore, the accurate position control necessary for the high density recording can be effected.

By recording the address signal and synchronizing signal along the guide tracks, the random access can be realized. In case of recording, the information signal can be recorded in a given position of the record medium and in case of reproduction, any desired information signal can be selectively read out. Further, since the synchronizing signal is regenerated from the guide track and the recording or reproducing is conducted under the control of the synchronizing signal, the accuracy can be improved. Furthermore, it is unnecessary to include a synchronizing signal in the information signal and thus, the freedom of a signal modulation system can be increased to a great extent.

What is claimed is:

1. An apparatus for optically recording an information signal along concentric or spiral information tracks on a record medium in an optical readable form by projecting a recording light beam having an intensity modulated in accordance with an information signal being recorded, the apparatus comprising:
   means for rotating a record medium wherein said record medium has a recording surface which is divided into a plurality of concentric recording regions by a plurality of concentric guide tracks which are recorded in an optically readable form to define boundaries between successive ones of said recording regions, each of said concentric recording regions being configured such that a plurality of information tracks may be formed therein;
   means for generating a tracking light beam for reading said guide tracks;
   means for focusing the tracking light beam onto said guide tracks;
   means for detecting a tracking error representing a deviation of the tracking light beam with respect to a selected guide track for producing a tracking error signal;
   first controlling means responsive to said tracking error signal for controlling the tracking light beam so that it follows said selected guide track during recording in a recording region associated with said selected guide track;
   means for emitting a recording light beam modulated in accordance with an information signal to be recorded;
   means for focusing the modulated recording light beam onto the record medium; and
   second controlling means for controlling the recording light beam with reference to a position of said selected guide track to form a plurality of concentric or spiral information tracks in the recording region associated with said selected guide track.

2. An apparatus according to claim 1, wherein said means for focussing the tracking light beam and said means for focussing the recording light beam comprise a common objective lens.

3. An apparatus according to claim 2, wherein an optical axis of the tracking light beam is made coincident with an optical axis of the objective lens, an optical axis of the recording light beam is inclined with respect to the optical axis of the objective lens, and said second controlling means comprises an optical device which changes an inclination angle of the recording light beam with respect to the optical axis of the objective lens.

4. An apparatus according to claim 3, wherein said optical device in the second controlling means comprises a mirror arranged rotatably in a light path of the recording light beam and a device for rotating said mirror in a stepwise manner in synchronism with a rotation of said record medium rotating means to change in a discrete manner a distance between spots of the tracking and recording light beams on the record medium so that successive information tracks are formed concentrically.

5. An apparatus according to claim 3, wherein said optical device in the second controlling means comprises a mirror arranged rotatably in a light path of the recording light beam and a device for rotating said mirror in a continuous manner in synchronism with a rotation of said record medium rotating means to change in a continuous manner a distance between spots of the tracking and recording light beams on the record medium so that successive information tracks are formed spirally.

6. An apparatus according to claim 2, wherein the apparatus further comprises means for detecting a focussing error signal representing a deviation of the objective lens with respect to the record medium and said first controlling means comprises means for moving said objective lens in a first direction parallel to the optical axis of the objective lens in response to the detected focussing error signal and in a second direction perpendicular to said first direction and to a track tangential direction in response to the detected tracking error signal so as to effect focussing and tracking control.

7. An apparatus according to claim 2, wherein said tracking light beam has a wavelength different from that of said recording light beam and the apparatus further comprises an optical device for splitting the tracking and recording light beams reflected by the record medium on account of the difference in wavelength.

8. An apparatus according to claim 1, further comprising third controlling means for moving said tracking light beam together with the recording light beam in a direction perpendicular to a track tangential direction so that the recording light beam is made incident upon a desired recording region in the record medium and the tracking light beam is made incident upon a guide track related to said desired recording region.

9. An apparatus according to claim 8, wherein said light beam generating means, focussing means, first and second controlling means are arranged integrally as a pick-up, and said third controlling means comprises a device for moving said pick-up in the direction perpendicular to the track tangential direction.

10. An apparatus for optically reproducing an information signal along concentric or spiral information tracks on a record medium in an optical readable form by scanning a reproducing light beam over said information tracks, the apparatus comprising:

means for rotating a record medium wherein said record medium has a recording surface which is divided into a plurality of concentric recording regions by a plurality of concentric guide tracks which are recorded in an optically readable form to define boundaries between successive ones of said recording regions, each of said concentric recording regions being configured such that a plurality of information tracks may be formed therein;

means for generating a tracking light beam for reading said guide tracks;

means for focusing the tracking light beam onto said guide tracks;

means for detecting a tracking error representing a deviation of the tracking light beam with respect to a selected guide track for producing a tracking error signal;

first controlling means responsive to said tracking error signal for controlling the tracking light beam so that it follows said selected guide track during reproducing in a recording region corresponding to said selected guide track;

means for emitting a reproducing light beam having a constant light intensity;

means for focusing the reproducing light beam onto the record medium; and second controlling means for controlling the reproducing light beam with reference to a position of said selected guide track to follow said plurality of concentric or spiral information tracks in the recording region associated with said selected guide track.

11. An apparatus according to claim 10, wherein said means for focussing the tracking light beam and said means for focussing the reproducing light beam comprise a common objective lens.

12. An apparatus according to claim 11, wherein an optical axis of the tracking light beam is made coincident with an optical axis of the objective lens, an optical axis of the reproducing light beam is inclined with respect to the optical axis of the objective lens, and said second controlling means comprises an optical device which changes an inclination angle of the reproducing light beam with respect to the optical axis of the objective lens.

13. An apparatus according to claim 12, wherein said optical device in the second controlling means comprises a mirror arranged rotatably in a light path of the reproducing light beam and a device for rotating said mirror in a stepwise manner in synchronism with a rotation of said record medium rotating means to change in a discrete manner a distance between spots of the tracking and reproducing light beams on the record medium so that the concentrical information tracks are successively scanned.

14. An apparatus according to claim 12, wherein said optical device in the second controlling means comprises a mirror arranged rotatably in a light path of the reproducing light beam and a device for rotating said mirror in a continuous manner in synchronism with a rotation of said record medium rotating means to change in a continuous manner a distance between spots of the tracking and reproducing light beams on the record medium so that the spiral information tracks are successively scanned.

15. An apparatus according to claim 11, wherein the apparatus further comprises means for detecting a focussing error signal representing a deviation of the objective lens with respect to the record medium and said first controlling means comprises means for moving said objective lens in a first direction parallel to the optical axis of the objective lens in response to the detected focussing error signal and in a second direction perpendicular to said first direction and to a track tangential direction in response to the detected tracking error signal so as to effect focussing and tracking control.

16. An apparatus according to claim 11, wherein said tracking light beam has a wavelength different from that of said reproducing light beam and the apparatus further comprises an optical device for splitting the tracking and reproducing light beams reflected by the record medium on account of the difference in wavelength.

17. An apparatus according to claim 10, further comprising third controlling means for moving said tracking light beam together with the reproducing light beam in a direction perpendicular to a track tangential direction so that the reproducing light beam is made incident upon a desired recording region in the record medium and the tracking light beam is made incident upon a guide track related to said desired recording region.

18. An apparatus according to claim 17, wherein said light beam generating means, focussing means, first and second controlling means are arranged integrally as a pick-up, and said third controlling means comprises a device for moving said pick-up in the direction perpendicular to the track tangential direction.

19. A method for processing optical information comprising:

forming a record medium having at least one preformed guide track and an associated recording region;

detecting said at least one guide track for producing a tracking signal; and recording a plurality of information tracks within said associated recording region at predetermined positions with respect to said at least one guide track in response to said tracking signal.

20. A method for processing optical information comprising:
   forming an optical record medium having at least one preformed guide track and an associated recording region;
   detecting said at least one guide track to provide a tracking signal;
   forming a plurality of information tracks within said associated recording region at predetermined positions with respect to said guide track in response to said tracking signal; and
   reproducing information in said information tracks by tracking said information tracks in response to said tracking signal.

21. The method of claims 17 or 20 wherein said at least one guide track is a plurality of guide tracks defining boundaries separating successive recording regions.

22. The method of claim 21 wherein said plurality of guide tracks are concentric.

23. The method of claim 22 wherein said plurality of information tracks in each recording region are concentric.

24. The method of claim 22 wherein said plurality of information tracks in each recording region are spiral.

* * * * *

UNITED STATES PATENT AND TRADEMARK OFFICE
CERTIFICATE OF CORRECTION

PATENT NO. : 4,507,763

DATED : March 26, 1985

INVENTOR(S) : K. Kato

It is certified that error appears in the above-identified patent and that said Letters Patent is hereby corrected as shown below:

```
On the front cover of the Patent, please change the
priority information from "55-14914" to -- 56-14914 --.
```

Signed and Sealed this

Twenty-ninth Day of September, 1987

Attest:

DONALD J. QUIGG

*Attesting Officer*    *Commissioner of Patents and Trademarks*